Dec. 14, 1937.   A. J. LARRECQ   2,102,424
MERCURY POWER PLANT
Filed March 23, 1934
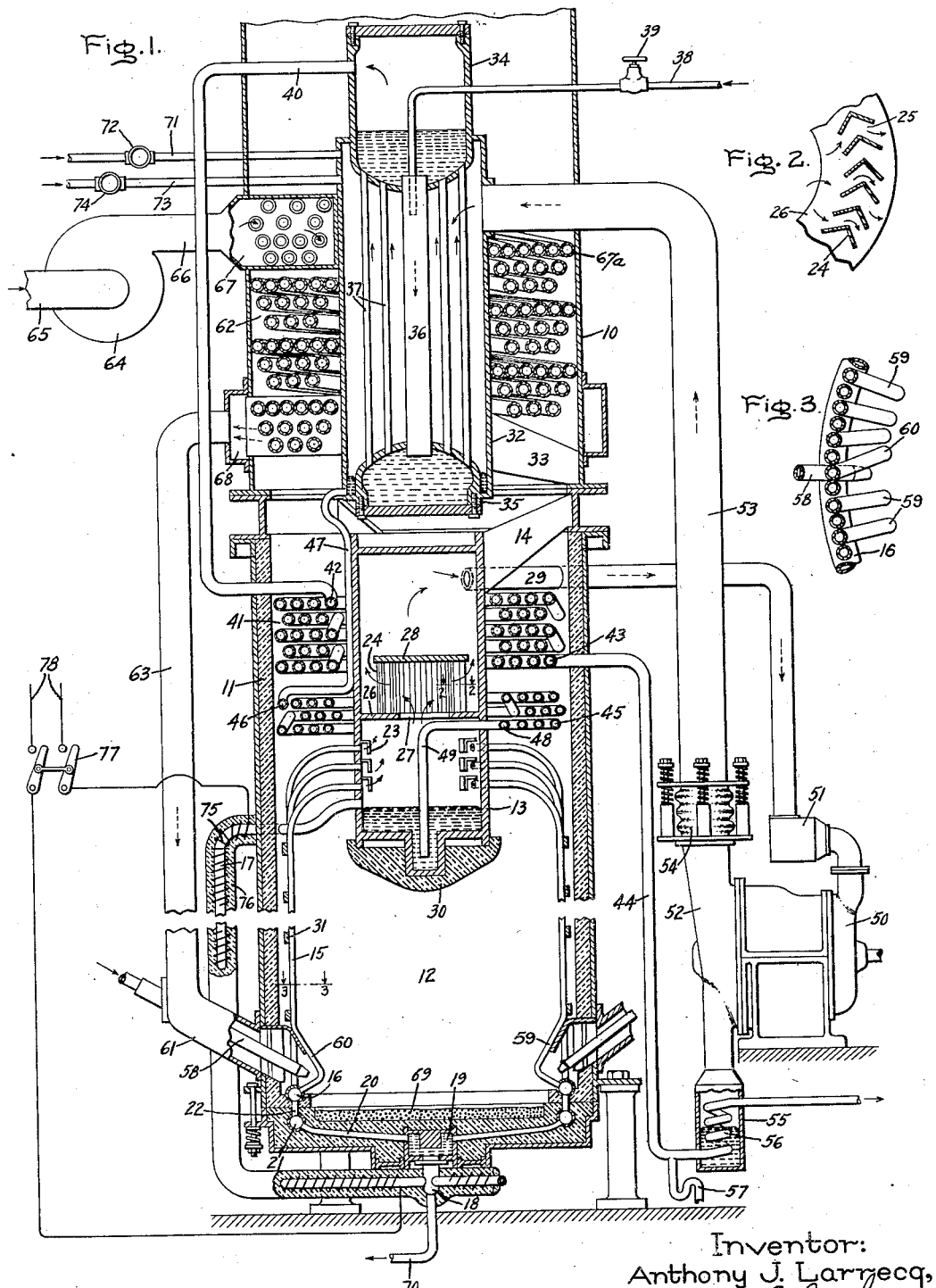
Inventor:
Anthony J. Larrecq,
by Harry E. Dunham
His Attorney.

Patented Dec. 14, 1937

2,102,424

UNITED STATES PATENT OFFICE 2,102,424

MERCURY POWER PLANT

Anthony J. Larrecq, Schenectady, N. Y., assignor to General Electric Company, a corporation of New York Application March 23, 1934, Serial No. 717,125

12 Claims. (Cl. 60—38)

The present invention relates to mercury power plants comprising boilers for evaporating mercury, turbines, or like apparatus receiving mercury vapor from the boiler and means including condensers preferably condenser boilers for condensing the mercury vapor exhaust of the turbine and returning condensate to the boilers.

One object of my invention is to provide an improved construction and arrangement of such plants whereby the economy of the plant is increased and the necessary floor space for the plant is reduced.

For a consideration of what I believe to be novel and my invention, attention is directed to the following description and the claims appended thereto in connection with the accompanying drawing which forms a part of my specification.

In the drawing, Fig. 1 is a front view partly in section of a mercury power plant embodying my invention; Fig. 2 is an enlarged sectional view along line 2—2 of Fig. 1; and Fig. 3 is an enlarged sectional view along line 3—3 of Fig. 1.

The mercury boiler together with the condenser and other elements, such as mercury and air preheaters, of my plant form a single unit in which the condenser is arranged on top of the boiler. This is an important feature of my invention. Its advantage is a considerable reduction in floor space and a more reliable and practicable arrangement for returning the condensed vapor to the boiler in cases of high boiler temperature.

In the embodiment represented by the drawing, the boiler, the condenser and other apparatus are enclosed in a cylindrical casing having an outer wall 10. A lower portion of this outer wall 10 has its interior covered with a brick wall 11 made of firebricks or other heat insulating and resisting material. The lower space defined by the wall 11 forms a combustion space 12. A boiler drum 13 is provided in the upper space defined by the wall 11 and held in position by means of brackets or struts 14 secured to the outer wall 10. The drum 13 forms a part of the boiler proper which latter also includes a plurality of heating elements receiving mercury liquid from the drum for heating and evaporating the liquid and returning it to the drum. These heating elements in the present instance have been shown as a plurality of tubes 15 lining the wall 11 to form a cylindrical heating unit or units. The lower ends of the tubes 15 are connected to a header 16 and their upper ends are connected to the drum above the liquid level thereof, that is, the upper ends communicate with the vapor space of the drum. Liquid is conducted to the lower header 16 of the heating tubes 15, which may be termed "up-tubes", by means of down-tubes 17 connected to a lower portion of the drum to receive liquid mercury therefrom. The down-tubes and up-tubes form heating elements. The down-tubes are preferably connected so that during the cold condition their upper ends connected to the drum are located somewhat above the cold liquid level in the drum. The lower ends of the tubes 17 are connected to a manifold 18 which has an upper portion 19 centrally located in the lower furnace wall. A plurality of radial tubes 20 lead from the upper portion 19 of the manifold to a header 21 which in turn is connected by tubes 22 to the lower header 16.

During operation, liquid mercury is conducted from the drum 13 through the down-tubes 17 into the manifold 19, whence it flows to the header 21, the connecting tubes 22, into the lower header 16 to rise into the up-tubes 15 where it is heated and partly evaporated. Due to the differences in pressure a continuous flow or circulation of fluid from the drum through the down-tubes and the up-tubes takes place. The speed of circulation is great whereby only a comparatively small amount of mercury is evaporated in the up-tubes. This is desirable because it permits a high rate of heat transfer to the up-tubes. The mixture of mercury liquid and vapor expelled from the upper ends of the up-tubes 15 into the drum is separated in the latter.

The liquid vapor separating means comprise a plurality of deflecting members 23 fastened to the drum and located adjacent the ends of the up-tubes. These deflecting members cause the mercury liquid to flow downward into the liquid space of the drum and permit the vapors to rise upward. As some of the liquid may be carried along with the vapor into the upper space of the drum, another separating means is provided comprising a plurality of angle irons 24 (see Fig. 2) arranged to form a plurality of narrow paths 25. The lower ends of the angle irons 24 are fastened to a partition 26 having a central opening 27 and the upper ends of the angle irons are fastened to an upper plate or cover 28.

During operation, mercury vapor together with some liquid flows through the central opening 27 in the partition 26, whence it is deflected to flow through the narrow paths 25 into the upper space of the drum to be discharged through a conduit 29 connected to the drum.

The bottom of the drum is covered by firebricks or other heat resisting material 30 to protect it from the excessive heat of the radiant source of heat. The refractory face also serves to concentrate heat radiation upon the lower or coolest parts of the up-tubes particularly at light loads. The up-tubes 15 are held in position by a plurality of rings 31 fastened thereto by any suitable means such as welding. The condenser which, as pointed out above, is located at a level above the boiler proper comprises an outer casing 32 held in position by a plurality of brackets or struts 33 supported by the outer casing 10. Upper and lower portions of the condenser casing 32 form headers 34 and 35 respectively. These headers are connected by down-tubes and up-tubes. In the present instance I have shown a single down-tube 36 connecting the central portions of the headers and a plurality of up-tubes 37. Water or like cooling medium is conducted to the condenser by a tube 38 including a valve 39 and steam or like gaseous medium is discharged from the upper header of the condenser through a conduit 40. This steam or gaseous medium in the present instance is conducted through a superheater 41 comprising a plurality of layers of spirally wound tubes having an inlet 42 and an outlet 43. The layers are slightly inclined to insure drainage and encircle the outer wall of the boiler drum 13. The outlet 43 of the superheater is connected to a discharge tube 44.

The condenser is connected to the boiler drum 13 through the intermediary of a liquid heater 45 comprising a plurality of layers of spirally wound tubes having an inlet 46 connected by a pipe 47 to a bottom portion of the condenser and an outlet 48 connected by a tube 49 to the liquid space of the drum 13. The mercury liquid flows by gravity from the condenser through the liquid heater into the boiler drum.

The vapor discharge conduit 29 of the drum is connected to a turbine 50 having an inlet chest 51 and an exhaust conduit 52, the exhaust conduit 52 being connected to an upper portion of the condenser drum by a long conduit 53 and a flexible connecting means 54. As will be readily seen, the turbine is located at about the same level as the boiler, but at a lower level than the condenser.

During operation, vapor is conducted from the drum 13 through the discharge conduit 29 and the chest 51 into the turbine, whence it is discharged from the exhaust conduit 52 and conducted through the conduit 53 into the condenser. Thus, the vapor discharged from the exhaust 52 of the turbine is caused to rise to a higher level, thereby utilizing a part of its energy content. The utilization of this energy is an important feature and a main reason for providing the condenser at a level above the level of the boiler proper. With this arrangement no pumps are necessary for pumping the condensate to the boiler proper. The condenser is so located that the condensate flows by gravity into the boiler drum.

The exhaust vapor of the turbine contains some moisture, that is, liquid particles. Means are provided for collecting the moisture and evaporating it. This means has been shown as comprising a sump 55 forming, in substance, a downward extension of the exhaust conduit 52 to collect liquid particles therefrom. The aforementioned conduit 44 for discharging superheated steam or like medium from the superheater 41 has a coiled portion 56 located within the sump 55. The heated medium conducted through the coiled portion 56 gives up a part of its heat content and thereby causes evaporation of the mercury liquid contained in the sump. The vapor rises through conduit 53 and flows into the condenser. The sump 55 together with the coiled portion 56 forms in substance a heat exchanger or an evaporator for evaporating liquid particles discharged into the exhaust 52 of the turbine.

The conduit 44 has a trap 57 for collecting liquid particles contained in the superheated medium conducted therethrough.

The condensation process in the condenser is as follows: The mercury vapor discharged from the conduit 53 into the condenser flows across the up-tubes 37 whereby its heat content is transferred to the water flowing through the tubes 37, causing condensation of the mercury and evaporation of water. The condensate collects on the bottom of the condenser and is conducted through the tube 47 into the liquid heater 45. The cooling medium, for instance water, contained in the upper header of the condenser boiler flows through the central down-tube 36 into the lower header, whence it rises through the up-tubes 37 into the upper header and is thereby partly evaporated, the vapor being discharged as stated above through the conduit 40 into the superheater 41.

Another feature of my invention is the particular arrangement for conducting combustible material and air to the boiler furnace. Preferably I use oil or pulverized coal and preheated air for operating the furnace. The fuel, such as oil, is forced into the furnace by means of a plurality of burners 58 projecting downwardly through the outer wall of the boiler to eject the combustible material towards the bottom of the furnace. To this end the up-tubes 15 of the boiler proper have lower portions 59 bent inwardly as shown in Fig. 1 and sidewise as clearly indicated in Fig. 3 with respect to the portion 60. Each alternate up-tube has an inwardly bent portion 59 to facilitate fastening of these tubes to the lower header 16. The portions 59 adjacent the burners 58 are bent sidewise to permit free flow of combustible material towards the bottom of the furnace. The burner 58 is surrounded by a jacket 61 for receiving preheated air to maintain combustion from an air preheater 62 through a conduit 63.

According to my invention the air preheater comprises a blower or compressor 64 having an inlet 65 and an outlet 66 connected to an air inlet chest 67. The latter is connected by a plurality of spirally or helically wound tubes 67a to an air outlet chest 68 which in turn is connected to the air conduit 63. The spirally or helically wound tubes are arranged to form layers of tubes which define a spiral passage or passages for the flow of combustion gases from the furnace to the flue. This is an important feature of my arrangement. The flow of combustion gases along the spiral paths causes a considerable amount of heat energy contained in said gases to be transferred to the air to be preheated. Such spiral paths for the flow of combustion gas may also be defined by the layers of tubes of the mercury liquid heater 45 and the steam superheater 41.

The firing arrangement of my plant is further improved by the provision of means to perfect combustion. It is known that the presence of segregated carbon imposes definite limitations upon the degree of possible atomization without fouling of burner tips when using fuel oil. This limitation necessarily reduces considerably the rate of possible combustion within a given furnace volume with such fuel. Furthermore, the zone of intense combustion is usually at some distance beyond the burner tips and the intervening space is largely unproductive as regards the liberation of heat. This non-uniformity of combustion or production of heat within a furnace is partly due to the time required to vaporize and oxidize the atomized fuel. According to my invention, combustion conditions are improved by the provision of means effecting direct application of heat to the surface of the fuel particles. This means comprises the slag bottom of the furnace and its relation to the burners themselves. As pointed out above, the burners are arranged to direct the fuel toward the bottom. The slag bottom radiates heat to the oncoming fuel particles, thereby effecting preliminary volatilization and radiation thereof. Subsequently the hydrocarbon residue impinges upon the slag bottom where it is further volatilized and oxidized by virtue of heat transfer directly from the slag bottom. At partial loads the slag bottom is still solid and in such instances further oxidation of liquid fuel occurs by virtue of surface combustion; the necessary air being directed to sweep over the slag bottom. At other loads the slag bottom is molten and the carbon residue is dissolved by the slag to be later oxidized in a series of reactions involving the slag constituents. In both of the aforementioned instances the oxidation of the combustible is accelerated by the presence of a hot slag bottom, either in the solid or molten state.

This process is best accomplished by the provision of an amount of iron ore 69 or the like on the bottom of the furnace. The provision of such metal will, when the metal is molten, assist the non-volatile matter of the combustible material to combine with oxygen. With this firing arrangement I minimize ineffective furnace volume and obtain greater uniformity of combustion and hence a greater flame depth with consequently increased radiant heat admission. The provision of a slag bottom increases the radiant heat emitting surfaces by virtue of the emissivity of slag bottoms. The assistance to combustion offered by the slag bottom dispenses with the need for extremely fine atomization and therefore the solid carbon residue of fuel oil will not foul the burner tips that can be used with this furnace.

Another important feature of my invention is the addition of a substantial amount of sodium or other substances such as aluminum and lithium to the mercury to reduce the vapor pressure obtained without such substances at the same boiler operating temperatures. Substances especially adapted for the present purpose are disclosed in the patents to Nerad, No. 1,964,592 filed August 17, 1931, and No. 1,964,593, filed July 1, 1933, and assigned to the same assignee as the present application. For example, mercury at a temperature of 1000° F. has a vapor pressure of about 180 lbs. per square inch absolute and under such condition has no superheat. With the addition of 2% sodium by weight to the mercury at 1000° F. a vapor pressure of approximately 115 lbs. is obtained and the superheat is roughly 75° F. With 4% sodium content at 1000° F. the vapor pressure is about 45 lbs. per square inch absolute and the superheat is approximately 200° F. Thus, as will be readily seen, the reduction in vapor pressure by the adding of sodium or like metal effects an increased superheat. This is desirable because the exhaust fluid in a turbine operated with highly superheated vapor has less entrained liquid, that is, high superheat means less moisture in the turbine and the turbine exhaust. With my present arrangement this has the additional advantage that little mercury liquid flows into the sump 55 of the turbine and practically all the exhaust flows directly up into the condenser boiler. I am aware of other arrangements in which sodium or other metals have been added. My invention differs from those arrangements in that a substantial amount of sodium or like metal in the order of several per cent by weight is necessary to obtain an appreciable effect in the reduction of vapor pressure and the increase in superheat.

Another important advantage of the adding of a substantial amount of other metals to the mercury to reduce its vapor pressure lies in the possibility of operating a plant at maximum efficiency under varying load conditions. In addition it permits the elimination of regulating valves for the turbine, especially when means are provided for varying the content of sodium or the like at varying load. For example, let us assume a mercury power plant is operated by mercury having a 3% sodium content by weight and a maximum load output of 10,000 kw. If the load on this power plant drops to 5000 kw., I increase the sodium content to about 4.5% which results in better efficiency at this load. Calculations have shown that with the proper regulation of the sodium content the over-all efficiency drops only 2% at a load change from 10,000 to 5000 kw. The over-all efficiency includes the efficiency of the boiler proper, the turbine, the condenser boiler and the auxiliary apparatus.

The content of sodium or like metal in the system may be varied by the provision of means for conducting liquid from the boiler and conducting pure mercury and pure sodium and the like to the boiler. In the present instance I have shown a conduit 70 connected to the bottom portion of the manifold 18 for draining liquid, that is, mercury together with sodium or the like, from the boiler. Connected to an upper portion of the condenser is a tube 71 including a valve 72 for conducting mercury to the condenser and another conduit 73 including a valve 74 for conducting sodium to the condenser. When it is desired to increase the sodium content, valve 74 is opened and sodium is conducted through the condenser into the boiler proper. When it is desired to reduce the sodium content, a part of the mixture of mercury and sodium is drained from the boiler through the drain conduit 70 and pure mercury is added through the conduit 71 into the condenser.

Thus, my invention also comprises an improved method of operating power plants using a mixture of mercury and a substance in the mercury for increasing the superheat of the mercury at the operating temperature of the plant, according to which method the control of the power plant in response to variations in load is effected by controlling the mixture of mercury and such other substance, that is, by varying the relative amounts of mercury and such other substance forming the operating mixture; more specifically, one step of my method of operating power plants in response to a drop in load demand comprises the increasing of the relative amount of sodium or like substance in the operating mixture. Another step of my method comprises the reducing of the relative amount of sodium or like substance, or, from another viewpoint, the increasing of the relative amount of mercury in order to reduce the superheat of the mercury at the operating temperature of the power plant in response to increasing load on the plant.

A high content of sodium or like metal in the mercury may cause this mixture to solidify when cold. Thus, it may happen that the operating substance contained in the down-tube 17 of the boiler proper freezes. To permit starting of the boiler, it is necessary to melt the operating substance contained in said down-tubes. To this end I have provided means including a heating element 75 encircling the down-tubes 17 and covered by insulating material 76 for applying heat to the down-tubes during the starting operation. The heating resistance is connected through a switch 77 to a source of electric energy 78. During starting, the switch 77 is closed wherby the mixture contained in the down-tubes 17 melts. At the same time the mixture contained in the up-tubes 15 is melted by the heat radiated against the tubes from the combustion chamber. Hence, the melting of the substance contained in the down-tubes 17 permits the circulation of fluid through the down-tubes into the up-tubes. As stated above, the down-tubes 17 are connected to the drum at a point somewhat above the cold liquid level. This permits liquid to flow from the down-tubes back into the drum during the starting operation in case it should happen that the liquid in the down-tubes melts and thereby expands before the liquid content in the up-tubes 15 is melted.

What I claim as new and desire to secure by Letters Patent in the United States is:

1. In a mercury power plant, the combination of a boiler, a condenser connected to the boiler being located at a level above the boiler, a turbine receiving mercury vapor from the boiler being located at the level of the boiler, a conduit for conducting exhaust vapor from the turbine into the condenser whereby a part of the energy content in the exhaust vapor is utilized in conveying the exhaust vapor to a higher level, and an evaporator connected to the turbine exhaust for receiving liquid particles exhausted from the turbine and evaporating them.

2. In a mercury power plant, the combination of a turbine, a boiler located at the level of the turbine and connected to the turbine inlet for supplying mercury vapor thereto, a condenser entirely supported on the boiler and located at a level above that of the turbine and connected to the turbine exhaust to receive exhaust vapor from the turbine whereby the energy content of the vapor exhaust is utilized to force the vapor exhaust to a higher level, a superheater connected to the boiler, and an evaporator associated with the turbine exhaust and connected to the superheater for evaporating liquid particles contained in the turbine exhaust.

3. In a mercury power plant, the combination of a turbine, means connected to the turbine inlet for supplying mercury vapor thereto, a condenser located at a level above that of the turbine and connected to the turbine exhaust to receive exhaust vapor from the turbine whereby the energy content of the vapor exhaust is utilized to force the vapor exhaust to a higher level, the turbine being operated to discharge vapor in a saturated state, and means associated with the turbine exhaust for transferring heat energy to the vapor exhaust for evaporating liquid particles in the turbine exhaust.

4. In a mercury power plant, the combination of a boiler having a cylindrical outer casing, a wall of heat resisting material lining the interior of a lower portion of the casing to define a combustion space, a drum and heating elements being at least partly disposed within said space, a turbine for receiving vapor from the drum, a condenser boiler diposed within and supported on the cylindrical casing above the drum for receiving exhaust vapor from the turbine, and means for conducting condensate from the condenser to the drum comprising a liquid heater having a plurality of series-connected layers of spirally wound tubes encircling the drum and exposed to the fire gases discharged from the combustion space.

5. In a mercury power plant, the combination of a boiler having a cylindrical outer casing, a wall of heat resisting material lining the interior of a lower portion of the casing to define a combustion space, a drum and heating elements disposed within said space, a turbine for receiving vapor from the drum, a condenser boiler disposed within the cylindrical casing above the drum for receiving exhaust vapor from the turbine and discharging condensate by gravity into the drum, a burner for injecting combustible material into the combustion space, and means for forcing air into the combustion space to maintain combustion comprising an air preheater having a plurality of parallel-connected tubes spirally wound about the condenser and heated by the fire gases escaping from the combustion space.

6. In a mercury power plant, the combination of a boiler having a cylindrical outer casing, a wall of heat resisting material lining the interior of a lower portion of the casing to define a combustion space, a drum and heating elements disposed within said space, a turbine for receiving vapor from the drum, a condenser boiler disposed within the cylindrical casing above the drum for receiving exhaust vapor from the turbine and discharging condensate by gravity into the drum, a burner for injecting combustible material into the combustion space, and means for forcing air into the combustion space to maintain combustion comprising an air preheater having a plurality of tubes spirally wound about the condenser and arranged to define a spiral path for the combustion gases discharged from the combustion space.

7. In a mercury power plant, the combination of a furnace, a boiler with inlet and outlet conduits for boiler fluid, heating elements having portions disposed external the furnace, an operating substance for the boiler comprising mercury and several per cent by weight of a substance for increasing superheat associated with the mercury, means for starting the boiler including an electric source of heat for heating the operating substance contained in the external portions of the heating elements, and means for altering the content of the substance for increasing superheat in the mercury liquid during operation.

8. In a mercury power plant, the combination of a mercury boiler having inlet and outlet conduits for boiler fluid, an operating substance for the boiler comprising mercury liquid and several per cent by weight of a substance for increasing superheat associated with the mercury liquid to reduce the vapor pressure of the mercury at the operating temperature of the boiler, and means for altering the content of the substance for increasing superheat to permit operation of the plant at maximum efficiency under varying load conditions, whereby the load output may be controlled by varying the content of the substance for increasing superheat.

9. In the operation of a power plant comprising a boiler for generating and superheating mercury vapor using a mixture of mercury and a substance in the mercury for increasing the superheat of the mercury at the operating temperature of the plant, the method of increasing the relative amount of said substance to increase the superheat of the mercury at the operating temperature of the plant as the load on the power plant decreases.

10. In the operation of a power plant comprising a boiler for generating and superheating mercury vapor using a mixture of mercury and a substance in the mercury for increasing the superheat of the mercury at the operating temperature of the plant, the method of reducing the relative amount of said substance and increasing the relative amount of mercury to reduce the superheat of the mercury at the operating temperature of the plant as the load demand increases.

11. In the operation of a vaporizer using a mixture of mercury and a substance in the mercury for increasing the superheat of the mercury at the operating temperature of the vaporizer, the method of increasing the relative amount of said substance to increase the superheat of the mercury at the operating temperature of the vaporizer as the load demand decreases, and reducing the relative amount of said substance and increasing the relative amount of mercury to reduce the superheat of the mercury at the operating temperature of the vaporizer as the load demand increases.

12. In a mercury power plant, the combination of a boiler having a cylindrical outer casing, a wall of heat-resisting material lining the interior of a lower portion of the casing to define a combustion space, a drum centrally disposed within an upper portion of the combustion space, heating elements lining the wall and connected to the drum, a condenser centrally disposed within the casing above said drum, means for conducting mercury vapor to the condenser, and means for conducting mercury liquid from the condenser to the drum.

ANTHONY J. LARRECQ.